(12) United States Patent  (10) Patent No.: US 6,584,418 B2
Murphy et al.                (45) Date of Patent:     Jun. 24, 2003

(54) POWER MONITOR WITH INDICATORS (75) Inventors: Joseph F. Murphy, Waukegan, IL (US); Harry L. Dexter, Buffalo Grove, IL (US); Nicolas D. L. Jones, Kitchener (CA)

(73) Assignee: Woodhead Industries, Inc., Deerfield, IL (US)

( * ) Notice: Subject to any disclaimer, the term of this patent is extended or adjusted under 35 U.S.C. 154(b) by 0 days.

(21) Appl. No.: 09/867,826

(22) Filed: May 30, 2001

(65) Prior Publication Data

US 2002/0022935 A1 Feb. 21, 2002

Related U.S. Application Data (60) Provisional application No. 60/182,994, filed on Feb. 16, 2000.

(51) Int. Cl.$^7$ .............................. G06F 19/00
(52) U.S. Cl. ............................. 702/60
(58) Field of Search ................ 702/60, 58, 65, 702/57, 62, 64

(56) References Cited

U.S. PATENT DOCUMENTS 3,562,545 A * 2/1971 Rubner et al. ............... 307/87

OTHER PUBLICATIONS

IBM Inc., "Multibus Analog Voltage Limit Detector", Jun. 1978, IBM Technical Disclosure Bulletin, vol. 21, pp. 50–52.*

* cited by examiner

Primary Examiner—Michael Nghiem
(74) Attorney, Agent, or Firm—Emrich & Dithmar (57) ABSTRACT A device for monitoring power conditions in the power leads of a communication network or power distribution bus includes a microprocessor 54 which measures the voltage on the power leads and computers a filtered bus voltage, Vbus, and a time-averaged bus voltage, Vave. From these, the microprocessor determines whether overvoltage, undervoltage or ripple conditions exist to actuate associated visual indicator intermittently (LEDs 57, 58, 59), or surge, brownout or transient conditions to actuate the associated indicators (LEDs 57, 58, 59) constantly for their associated slot times in a display cycle. The device may be in the form of a compatible terminator or a Tee for the network or power bus.

11 Claims, 4 Drawing Sheets

POWER MONITOR WITH INDICATORS

This application claims benefit of the filing date of PCT Application No. PCT/US01/05177 filed Feb. 16, 2001 which is based on U.S. Provisional Application No. 60/182,994, filed Feb. 16, 2000.

FIELD OF THE INVENTION

The present invention relates to electrical networks which provide power for devices and which may also permit data communications over the network. Typically, these networks include buses which may include both data leads and power leads. In particular, the present invention relates to apparatus for monitoring and indicating a number of different power conditions on the power leads. By way of illustration only, the present invention is disclosed in accordance with the data lead and power lead convention used in the "DeviceNet" industrial communications network.

BACKGROUND OF THE INVENTION

There are various protocols and specifications for networks or buses used for industrial communications. These types of buses are sometimes herein referred to as "Data/Power" buses. As indicated and for exemplary purposes only, the present invention is disclosed with reference to a particular industrial communications Data/Power bus protocol known as the "DeviceNet" protocol. Persons skilled in the art will understand that the invention has broader application than this particular Data/Power bus, and persons skilled in the art will equally well understand the nature of the invention and how it might be applied to monitor systems other than industrial communication networks which have extended DC power.

The DeviceNet bus system employs five leads—two power leads, two data leads, and one lead for shielding. By convention or specification, the leads are numbered 1 through 5, with lead 1 being the shield lead, leads 2 and 3 being the power leads (lead 2 is the positive power or voltage lead, and lead 3 is the negative power lead), and leads 4 and 5 being the pair of data leads. Again by convention, when viewing an electrical connector for the bus, the leads are uniformly identified by accepted convention, as will be further described.

Currently, terminator resistors are used to terminate the data leads on DeviceNet systems according to system specifications. The DeviceNet specification requires that the terminating resistor be connected between leads 4 and 5 (the data leads) and that it have a certain value, wattage and tolerance. For example, presently the terminating resistor is at 121 ohm, ¼ watt, 1% tolerance resistor connected across leads (or connector pins) 4 and 5.

Terminating devices (or "terminators" for short) are currently manufactured for connecting to male or female connectors of a DeviceNet bus. These terminating devices have the terminating resistor connected between the appropriate connector pins and housed within a molded body formed over an insulating insert which receives and supports the electrical connector elements (whether male or female).

The power used in the DeviceNet bus system is DC power. In order that peripheral devices such as displays or printers or the like, as well as sensors and actuators, can be designed to operate with the DeviceNet system, the voltage on the power leads has a nominal design value, e.g., 24 VDC. In order to determine the voltage actually present in any given system, typically a measuring device such as a volt meter is employed to measure the voltage manually. The technician then makes appropriate decisions as to the existing power conditions and whether they are within system specifications. Manual systems of this type measure only current conditions and do not record incidents when the power may not have met specifications, and therefore, indicated possible maintenance attention. Moreover, such manual systems are dependent on the skill and availability of service personnel.

SUMMARY OF THE INVENTION

According to the present invention, a bus terminator includes a circuit having a bi-color light emitting diode (LED) (or two individual indicators) connected in circuit with a current-limiting resistor, if necessary, between pins 2 ($V^+$) and 3 ($V^-$). The terminator includes a clear or translucent molding material encompassing the LED and current limiting resistor so that the light emitted from the LED may be easily viewed. As used herein, the term "light-transmissive" is used to refer to the light transmitting property of the overmold material. It is intended that this term be construed broadly to include not only clear molding material, but also translucent materials of wide range of light transmissivity, provided only that the light can be perceived by an observer in the intended use environment.

By way of example, the LED indicators may have a green and a red color, respectively; and, as is known, the bipolar device consists of two separate LEDs connected together anode-to-cathode so that one LED is lit for one polarity and the other LED is energized if the applied voltage is of reverse polarity.

In this manner, using the terminator of the present invention, a person viewing the terminator can readily determine whether: (i) there is no power present (i.e., no light being emitted from the LED); (ii) power is present with the correct polarity (green light being emitted from the LED); or (iii) power is present but of a reverse polarity (red light being emitted from the LED).

In this manner, the observer can determine readily, without the need of instruments, whether power is present, and if so, whether it is of the correct or reversed polarity.

Moreover, as will be further disclosed below, by sensing the voltage at the two power leads and transmitting the sensed voltage to a microprocessor, the microprocessor, installed within a network terminator or a Tee, together with a plurality of LEDs (each of a different color), may detect and signal a wide range of present and past power conditions. By way of example, which is not intended to limit the invention in any manner, a steady green light may mean that the voltage is within a normal range and of proper polarity and no errors have been detected since the last reset. A steady red light may indicate an unacceptably high voltage or "overvoltage." A steady blue light may indicate a low voltage or "undervoltage," whereby the voltage is beneath the normal desired voltage range. A flickering (or other flash sequence) red light generated by the microprocessor may indicate that there is a voltage surge, that is, an overvoltage condition followed by return to normal voltage. A flickering blue light may indicate an undervoltage followed by a return to normal, or "brownout." Similarly, a steady amber light may indicate a detected voltage "ripple," and a flickering amber light may indicate a "glitch" (or "transient") in which the ripple condition occurred but no longer persists. The conditions indicated by a flickering indicator are latched, thus preserving, at least temporarily and until reset, a record of the indicated event for later viewing. The conditions and events mentioned may vary and the limits or thresholds may be modified according to the designer's choices. Unless otherwise specified herein, all voltages referred to are DC voltages.

The microprocessor and indicating LEDs may be incorporated into a terminating device in the case where data leads are included in a network bus being monitored. In this case, the indicating LEDs are encased in a light transmissive molded material. Alternatively, the electronics and LEDs may be incorporated into a Tee configuration which may be inserted into the network at an intermediate monitoring location or at a junction point. The Tee configuration includes a panel of light transmissive overmold for permitting viewing of the indicators.

Other features and advantages of the present invention will be apparent to persons skilled in the art from the following detailed description of exemplary embodiments accompanied by the accompanying drawings wherein identical reference numerals will refer to like parts in the various views.

DETAILED DESCRIPTION OF THE EXEMPLARY EMBODIMENTS

Figure 1:
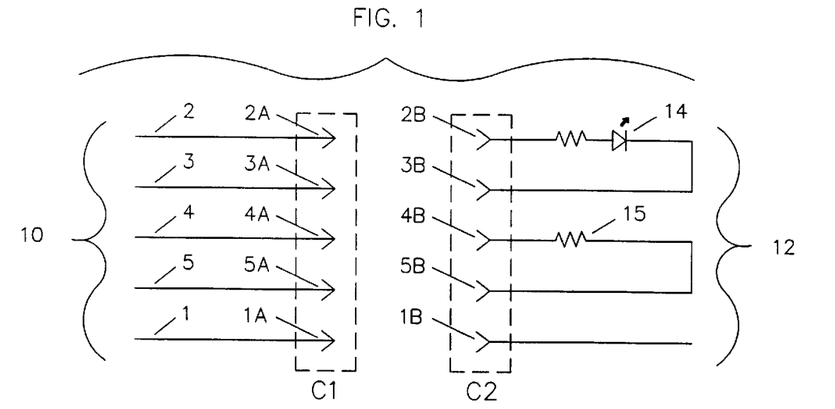
FIG. 1 is an electrical schematic diagram of a Data/Power bus and a terminating circuit according to the present invention.

Referring first to FIG. 1, reference numeral 10 generally designates a five-lead Data/Power bus with the five leads designated respectively: 1 is the rf shield, 2 and 3 are the power leads (lead 2 being the positive polarity and lead 3 the negative), and 4 and 5 are data signal leads. The right end of leads 1-5 may be connected to or supplied with connector elements diagrammatically illustrated as arrow heads representing male connector elements. Leads 1-5 may equally well be connected to or supplied with female connector elements. Adapted for connection to the leads 1-5 of the bus 10 is a terminator diagrammatically represented and generally designated as reference numeral 12.

Whereas in FIG. 1, the leads of the bus 10 are designated 1, 2, 3, 4 and 5 when the leads are brought out externally to a connector, such as enclosed within the block designated C1 in FIG. 1, the elements of the connector C1 associated with particular leads are referred to using the same numerical designation followed by an "A." The connector element associated with the lead 2 is designated 2A and is sometimes referred to as "pin 2." Similarly, a female connector for mating with connectors C1 is designated C2, and its connector elements are 1B-5B, respectively. The female connector element (illustrated as the tail of an arrow and designated 2B) in the terminator 12 to be connected to lead 2 is similarly referred to as "pin 2" in the terminator 12. Thus, "pin 2" may refer to either a male or female connector element, but the lead or "pin" being referred to is the same. Such conventions are well known to persons skilled in the art and are not repeated for brevity.

Connected between connector elements 2B and 3B of connector C2 of the terminator 12 is a light-emitting diode (LED) generally represented at 14. Although the LED 14 in FIG. 1 is shown as a simple LED, as will be made clear from subsequent description, it is preferably a bi-polar LED or two separate LEDs connected in opposing polarity, although a single LED such as the one shown at 14 could be used with less diagnostic information being conveyed to the observer.

Connected between the connector elements 4B and 5B of the connector C2 of terminator 12 is a terminating resistor 15.

Figure 2:
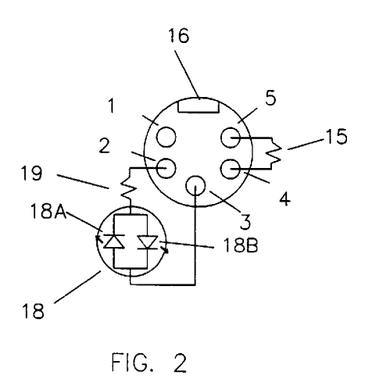
FIG. 2 is an electrical/mechanical schematic diagram of the connector interface of a female insert according to the present invention, as viewed from the back of the insert.

Referring now to FIG. 2, reference numeral 16 indicates an insert for a female connector for a terminator. The "insert" of a connector is a body of insulating material, usually plastic, in which the individual connecting elements are embedded and secured. Five connecting elements are shown in FIG. 2 and represented by interior circles representing pins 1-5. Again, the designations 1-5 in FIG. 2 refer to the pins of the insert 16 or the leads of the bus 10. As seen in FIG. 2, the terminating resistor 15 is connected between pins 4 and 5 of the insert 16, and a bi-polar LED 18 is connected in series with a current-limiting resistor 19 to form a circuit which is connected between pins 2 and 3 of the insert 16.

As is known in the art, the bi-polar LED 18 comprises two individual LEDs, designated respectively, 18A and 18B in FIG. 2. These two LEDs are connected anode-to-cathode (i.e., in reverse polarity). One LED 18B is illuminated (e.g., green) when the voltage on pin 2 is positive relative to voltage on pin 3, that is, in accordance with proper system specification. The second LED 18A is illuminated (e.g., red) when the voltage on pin 3 is positive relative to the voltage on pin 2. The function of the resistor 19 is to limit the current through the bi-polar LED 18 irrespective of polarity so it is maintained the current within design limits.

Figure 3:
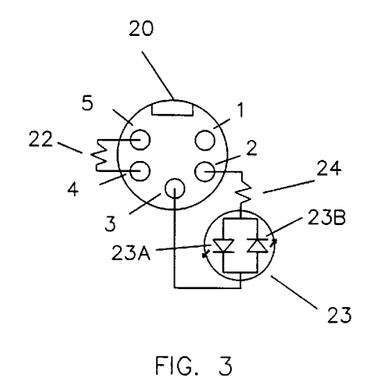
FIG. 3 is an electrical/mechanical schematic diagram of a male insert according to the present invention, again looking from the back of the connecting interface.

Turning now to FIG. 3, there is shown schematically a backview of a male insert 20 having 5 pins, again designated 1-5, and including a terminating resistor 22 connected between pins 4 and 5, and a series circuit comprising a bi-polar LED 23 and current limiting resistor 24 connected between pins 2 and 3. As used in this context, "front" refers to the interface or connecting end of the connector, and "rear" refers to the cable end. Comparing pins 2 and 3, for the female insert 16 of FIG. 2, the pins are numbered 1-5 in a counterclockwise direction, and for the male insert 20 of FIG. 3, the pins are numbered in a clockwise direction. Thus, the male and female inserts, when connected together, connect corresponding pins (or leads) of the two connectors C1, C2 of which the inserts are part.

Figure 4:
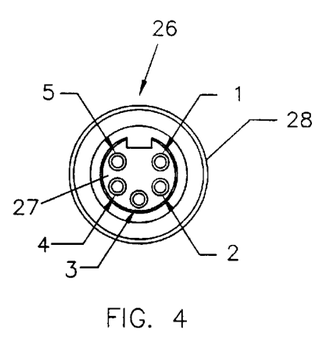
FIG. 4 is a front elevational view of an electrical terminator for a Data/Power bus constructed according to the present invention.
Figure 5:
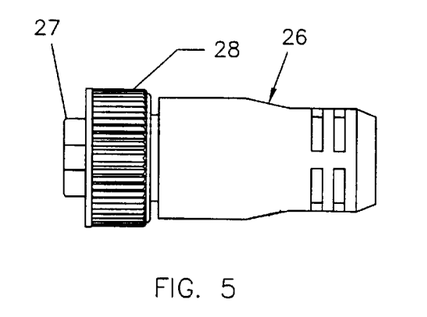
FIG. 5 is a side view of the terminator of FIG. 4.

Turning now to FIGS. 4 and 5, there is shown a physical embodiment of a terminator generally designated 26 and incorporating the present invention. Terminator 26 corresponds to the terminator shown at 12 in electrical schematic form in FIG. 1. The terminator 26 is adapted for connecting to a male connector and therefore includes a female insert 27. Received on the female insert 27 is an internally threaded coupling nut 28. A body 29 of molded, clear plastic (polyvinyl chloride) covers the rear end and a portion of the side wall of insert 27.

Referring now particularly to FIG. 4, the female insert 27 corresponds to the pin configuration of FIG. 2, so the pins are designated 1–5 in a counterclockwise direction when viewed from the rear because FIG. 4 is a view taken from the front or connecting side of the insert, whereas FIG. 2 is a view taken from the back or embedded end of the insert.

Figure 6:
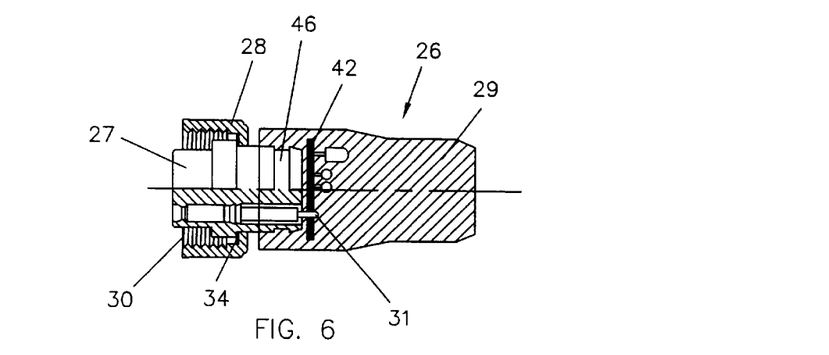
FIG. 6 is a view of the terminator of FIG. 5 with portions of the terminator shown in vertical cross-section.
Figure 7:
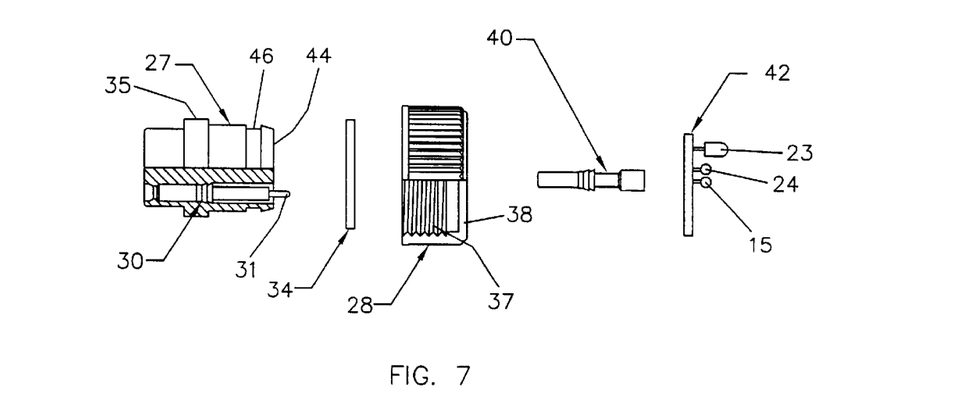
FIG. 7 is a side view of the terminator of FIGS. 4-6 with the principal elements shown in exploded relation and with the insert and coupling nut shown in partial vertical cross-section.

Turning now to FIGS. 6 and 7, the female insert 27 and coupling nut 28 are shown and molded body 29 is shown in FIG. 6 in cross-sectional view. The female insert 27 may be made of polyvinyl chloride, but in any case, it is an insulating body which carries the five female connecting elements, one of which is shown at 30. The connecting element 30 is a socket-type female connector which is conventional. In the illustrated embodiments, the female connector 30 includes a conductive extension 31 referred to as a "PC tail" for connecting to a printed circuit card or board such as the one shown at 42 which carries the electrical components of the terminator, such as the data lead terminating resistor and diagnostic LEDs.

Returning to the female insert 27, it also includes a raised rib 35, the rear surface of which forms a retainer shoulder for restraining the coupling nut 28 so that it is not dislodged from the insert 27.

The coupling nut 28 is conventional, including internal threads 37 and an annular rear wall portion 38 for engaging the rear surface of the rib 35 on the insert 27. As is known, a nylon washer 34 is located between the annular rear wall portion 38 and the rib 35 to reduce friction.

Referring particularly to FIG. 7, there is shown a female socket for an electrical contact designated 40 which is used as a socket connector element for pin 1 (the shield wire), designated 1B in FIG. 1. The components of the circuit, namely, the terminating resistor 15, the current limiting resistor 19 (24 in FIG. 3) and the bi-polar LED 18 (23 in FIG. 3) are mounted on the circuit board 42.

Referring now to FIG. 6, connector elements are assembled to the insert 27. The printed circuit board and components are then mounted using PC tails such as that designated 31 in FIG. 6 (and in FIG. 7). The slip washer 34 and coupling nut 28 are then assembled to the insert 27, and the body 29 is molded about the rear of the insert 27, encompassing the printed circuit board 42 and its components, as well as the exposed rear portions of the connector elements 30 and 40.

It will be observed from FIG. 6 that the rear portion of the insert 27 is provided with an annular recess 46 so that the molded material fills recess 46 during manufacturing, and provides a more secure attachment of the molded body 29 to the body of the insert 27.

The material forming the molded body 29 may be a clear polyvinyl chloride material well known for molding similar components in place. The clearer the material, the easier it is to see the light emitted by the LED 18. However, for most applications light from the LED may equally well be seen if the material is translucent, and the function of the LEDs may be effectively accomplished using molding materials having a wide range of light transmissivity. In addition, the physical construction or the shape of the molded body or both may increase the light transmissivity.

The operation of the invention thus far described will be clear to persons skilled in the art. Briefly, however, the female insert 27 and its associated socket connector elements 30 and 40 are assembled to a male connector corresponding to the same configuration, but of mirror image. The lock nut is then assembled to a corresponding externally threaded portion of the male connector, thus electrically connecting the components on the printed circuit board 42 in the circuit arrangement of FIG. 2, with the bi-polar LED connected between the power leads 2, 3 of the Data/Power bus to which the terminator is applied. In operation, as is conventional, the terminating resistor 15 terminates the data lines 4, 5, and the LED indicator 18 provides a visual diagnostic indication of: (i) correct polarity, or (ii) reverse polarity for the voltage lines 2, 3, or (iii) if no light is produced, an indication that there is no power available on the portion of the bus to which the terminator is connected.

There are many variations to the embodiment which has been disclosed, and these may be illustrated with reference to FIG. 8.

Figure 8:
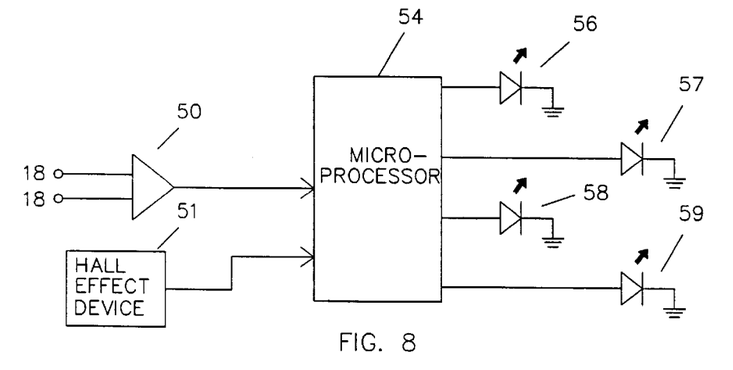
FIG. 8 is an electrical schematic diagram of an alternate embodiment of the present invention using a microprocessor to actuate indicator LEDs according to the line voltage conditions sensed by the microprocessor.

Turning now to FIG. 8, a voltage sensing circuit (analog-to-digital converter) 50 has its two input terminals connected respectively between lines or pins 2 and 3, representing the positive and negative terminals of DC power, $V^+$ and $V^-$. The output of the converter 50 is a digital representation of the difference in voltage between the terminals 2 and 3; and those signals are fed to a microprocessor 54 (or microcontroller) which determines the sampling times, as will be indicated.

The output of the microprocessor 54 may include a series of latches, each of which is connected to an associated LED such as those designated generally 56, 57, 58 and 59 in FIG. 8. Additional LEDs may also be included. The microprocessor is responsive to the magnitude of the digital voltage signals from the converter 50. The microprocessor is programmed to energize one or more of the LEDs 56–59 when predetermined line voltages are sensed. It is preferred to use output latches in the microprocessor (i.e., a microcontroller) to energize the LEDs under certain conditions to be described so that if a fault is detected, the associated indicating state will remain on display until the fault can be traced and corrected or the system is reset at a predetermined time. A Hall-effect sensor shown at 51 in FIG. 8 may be used to clear the latched indicators manually and reset the microprocessor.

If, during the cycle, there are no faults detected, so that none of the LEDs are energized, the microprocessor may then display the presently existing power condition. Alternatively, the microprocessor may be programmed to display the present power condition indefinitely or upon command or to reset each latched fault in a preset time after detection (e.g., 24 hours).

Figure 9:
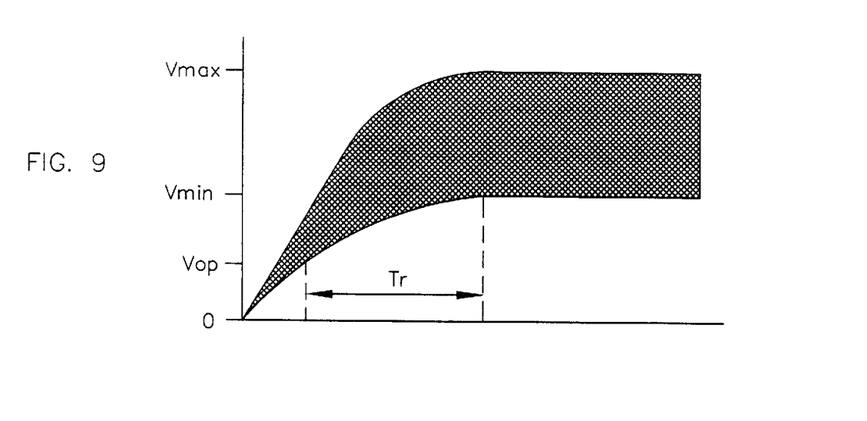
FIG. 9 is a graph showing nominal power characteristics for the power leads.

To better understand the operation of the system as controlled by the microprocessor 54, the power characteristics of the network should be understood. For this purpose, reference is made to FIG. 9. Referring then to FIG. 9, the shaded area indicates the range of voltages that may appear while meeting system power specifications after the power is turned on. The voltage level shown in FIG. 9 and designated Vop is the minimum operating voltage. By way of illustration and for purposes of understanding only, that voltage may be 6V DC, according to DeviceNet specifications. It bears repeating that the power monitoring device of the present application has application beyond DeviceNet specifications and configuration, and even beyond Data/Power buses to networked DC power distribution systems.

In the illustrated embodiment, supply voltages may be as low as 11V, but the worst-case minimum node supply voltage (Vmin) is 12.96V. That is, a properly designed network should supply no less than this voltage to each device on the network.

The same specification requires devices to operate with a node supply voltage as high as 25V, and this results in a maximum node supply voltage of (Vmax) 24.78V for a properly designed network. The power-on rise time, designated by the arrow Interest in FIG. 9 is a maximum of 500 milliseconds or one-half second.

The microprocessor 54 receives digital voltage representations from the signal conditioning and analog-to-digital converter circuitry 50, and it includes two low-pass software filters which generate bus voltage values for fault detection processing. A first low pass filter averages several samples of the bus voltage and filters out high frequency transients, to produce a filtered bus voltage referred to as Vbus. A second software filter averages a number of sequential Vbus measurements (i.e., samples) and generates a time-averaged bus voltage designated Vavg. The software filters are conventional and characterized in that the sample interval is typically 250 microseconds, the instantaneous bus voltage averaging integral is 1 millisecond, and the average bus voltage (Vave) averaging interval is 16 milliseconds. Using these intervals, persons skilled in the art will be readily able to program the described software filters.

In general, the microprocessor detects both instantaneous (or "present") faults relating to instantaneous voltage levels and dynamic (or "latched") faults relating to changes in the nominal or averaged bus voltage rather than instantaneous voltage values. That is, a present fault is related to the bus voltage at a particular instant in time and is determined by comparing the averaged bus voltage to predetermined, fixed limits. A dynamic fault is related to a change in the bus voltage rather than the instantaneous or absolute bus voltage value. The limits are selected to avoid false-positive indications, taking into consideration the accuracy of the detection hardware (which may be better than plus or minus two percent) and the worst-case design requirements for a properly installed network or power bus of interest.

Under these conditions, two instantaneous faults are defined as an Undervoltage event and an Overvoltage event. The maximum Undervoltage threshold is set to the specified minimum device supply voltage to avoid nuisance fault indications on properly installed networks. Thus, an Undervoltage condition is detected by the microprocessor if the averaged bus voltage (Vave) falls below the undervoltage threshold, which is set at the minimum device supply voltage for avoiding nuisance fault indications on properly operating networks, which in the case of DeviceNet is 12.9V. However, as persons skilled in the art will appreciate, any fixed threshold may equally well be employed. For the illustrated embodiment, an Overvoltage event is detected when Vave exceeds the minimum overvoltage threshold is exceeded. The minimum overvoltage threshold is set to the calculated maximum device supply voltage to avoid nuisance fault indications in properly installed networks. Again, in the illustrated embodiment, if the detected instantaneous voltage exceeds 25.3V, an overvoltage condition is sensed. The power supply ripple specifications are excluded from threshold calculations since the ripple is filtered by the bus voltage sampling software.

Dynamic faults include faults which are related to changes in the bus voltage, as already mentioned. One such dynamic fault is referred to as a Transient Voltage Error. The detection threshold (DV/DT) is determined by the delay generated as a result of the software filters and the transient voltage threshold (Vthreshold). The transient detection voltage preferably varies with the duration of the transient and is designed to trigger at lower voltages for faster rise times. For example, for a transient rise time equal to or greater than 16 milliseconds, the transient threshold may be 75V per second, resulting in a minimum peak transient voltage of 1.26V. For a transient rise time of 10 milliseconds, the transient threshold may be 90V per second with a minimum peak transient voltage of 0.9V. For a transient rise time of 5 milliseconds and a transient threshold of 160V per second, the peak transient voltage may be 0.84V. For a transient rise time of 1 millisecond and a transient threshold of 640V per second, the peak transient voltage may be 0.67V. Persons skilled in the art will readily be able to modify or complement these values while accomplishing the purpose of the invention.

A second dynamic fault detection is referred to as a ripple event, and it is detected as repeated transients above a predetermined minimum repeat frequency. The maximum ripple frequency is subject to the transient detection algorithm characteristics. For sine wave ripple (that is, ADVERSARY COMPLAINT line pollution), a low cut-off frequency is subject to the transient detection algorithm characteristics. The ripple frequency may be set at a minimum of 10 and a maximum 250 Hz, and the cut-off frequency for sine wave ripple, for a −1.5V peak-to-peak, may be a minimum of 20 and a maximum of 250 Hz. For the cut-off frequency for sine wave ripple with a 2.6V peak-to-peak voltage, a minimum of 10 and a maximum of 250 Hz may be used. Ripple detection may begin to degrade from frequency-related effects above the maximum frequency values given.

In operation of the microprocessor, the bus voltage sampling is not enabled until the maximum transient time after power has been turned on. This eliminates a false positive Undervoltage and Transient faults that occur during power-up due to bus voltage rise from an initial operating point to the network's stable operating voltage. Faults are not enabled until the Vbus is calculated by the microprocessor. Faults requiring Vavg are not enabled until the initial Vavg is calculated. Each latched fault condition is automatically cleared after a nominal 24 hours has passed, by the microprocessor, since the last fault of that particular type.

The microprocessor thus detects and computes three instantaneous or "present" conditions—they are as follows:
1. Overvoltage. This is a detected event if Vbus exceeds the overvoltage threshold.
2. Undervoltage. This is detected if Vbus is less than the undervoltage threshold.
3. Ripple. This condition is detected if a transient is detected at a rate (DV/DT) faster than a predetermined minimum ripple frequency.

The following three conditions are detected and latched by the microprocessor:
1. Surge. This condition is detected if an overvoltage condition occurs and, following the detection of the overvoltage condition, Vbus returns to a nominal value (i.e., within design range or specification).
2. Brownout. This condition is detected if the microprocessor detects that an undervoltage condition has occurred and, following that detection, Vbus returns to a nominal value.

3. Transient. This condition is detected if Vbus differs from Vavg by Vtransient. That is, if the difference between the instantaneous bus voltage and the average bus voltage exceeds the predetermined transient voltage, a transient event is detected and latched.

The microprocessor 54 then, depending upon the events detected, may energize one of four LEDs designated respectively 56, 57, 58 and 59 in FIG. 8. The magnetic Hall-effect device 51 is coupled to the microprocessor 54 and is used to clear the fault memory when an operator activates the Hall-effect magnetic switch using a magnetic screwdriver or other magnetic object. The fault indications which are displayed use a repeating pattern of visual indications on the LEDs 56–59. The microprocessor 54 defines a repetitive cycle which has specific time slots within the cycle. The present conditions which have been detected are indicated, as well as the latched fault indications are also visually displayed according to the Table 1 set out below.

TABLE 1

| Fault | Visual Indication | Slot Number |
|---|---|---|
| (a) None | Green | 1 |
| (b) Power-On | Flashing Green (2 Hz flash) | 1 |
| (c) Overvoltage | Red | 1 |
| (d) Undervoltage | Blue | 1 |
| (e) Ripple | Amber | 1 |
| (f) Surge | Flickering Red (10 Hz flash) | 2 |
| (g) Brownout | Flickering Blue (10 Hz flash) | 3 |
| (h) Transient (or Glitch) | Flickering Amber (10 Hz flash) | 4 |

The entire display cycle, which recurs in a repeating pattern, as indicated, has the following time slots and associated time intervals: Slot 1—2.2 seconds, followed by Slot 2 for 0.05 seconds, followed by Slot 1 for 0.2 seconds, followed by Slot 3 for 0.05 seconds, followed by Slot 1 for 0.2 seconds, followed by Slot 4 for 0.05 seconds, and finally, followed once more by Slot 1 for 0.2 seconds. Thus, when the microprocessor initiates a detected fault for the first portion of the display cycle, or "Slot 1," those conditions indicated in Table 1 and associated with Slot 1 are indicated. That is, the associated LED of the indicated color is energized by the microprocessor. For example, if power is on, then the green LED, which may be LED 56, by way of example, flashes green at 2 cycles per second. If, in addition, an instantaneous overvoltage condition is detected, the red LED, which may be LED 57 is also energized during this first time slot.

Upon initial start-up, that is, when the power is turned on, a flashing green indication, LED 56, is given until the first time that the magnetic actuator sets the Hall-effect device to reset the microprocessor (or a predetermined period expires). Thereafter, the flashing green "Power-On" indicator is not energized, and if no fault exists or is detected, then the green LED 56 is energized continuously by the microprocessor during Slot 1 times in the cycle.

Following the initial time-slot, the shortened time slot of 0.05 seconds is displayed, and during that time slot, only the LED 57 (red) is energized provided that a surge condition had been detected and latched. The indicator, during this time slot, is flashed at a 10 cycle per second rate. Following the second time slot, there is a third time slot of 0.2 second duration in which the Slot 1 indications are again provided to the observer or user. Next, in the fourth time slot of a given cycle, Slot 3 indicator (brownout) is actuated at a 10 Hz per second flash (flickering blue) if a brownout condition had been sensed and latched by the microprocessor. Thereafter, Slot 1 status is generated by the microprocessor for 0.2 seconds, and thereafter, in the sixth time slot of the cycle, for a duration of 0.05 seconds, the Slot 4 condition is flashed, if it had been detected. This is a condition of a sensed glitch or transient, and is indicated by a flickering amber light, corresponding to LED 59, at a flash rate of 10 cycles per second.

Figure 10:
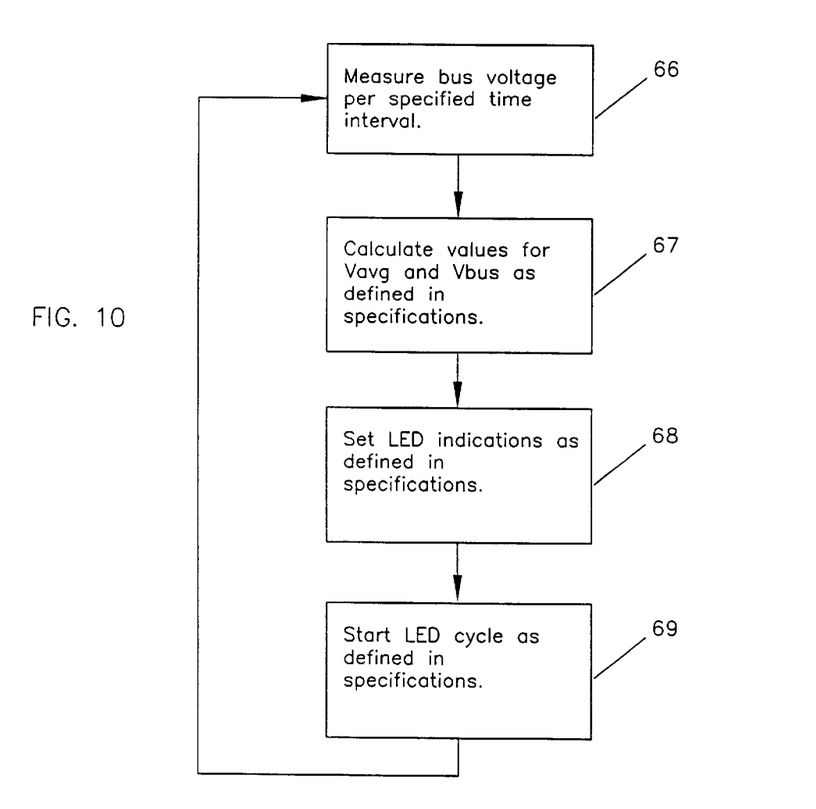
FIG. 10 is a flow chart for the programming of the microprocessor.

Referring now to FIG. 10, there is shown a programming flow chart for the microprocessor 54. FIG. 10 shows the programming of the microprocessor for each individual display cycle for the LEDs. That is, the display cycle already described in connection with Table 1, is periodically repeated. In Block 66, the microprocessor samples and measures the bus voltage for the specified time intervals indicated above. These measurements are stored in digital format and the microprocessor then, as indicated in Block 67, calculates the values for Vavg and Vbus, as defined above in the specification for those measurements. Next, the microprocessor sets the LED indication, as described in the specification above, and in particular in connection with Table 1. This is indicated in Block 68.

The microprocessor then starts the LED display cycle as indicated above and as represented in Block 69 of FIG. 10. The data displayed in each time slot of a display cycle are shown in the column "Visual Indication" in Table 1. The microprocessor also establishes and maintains the timing for the various time slots within a given display cycle.

Figure 11:
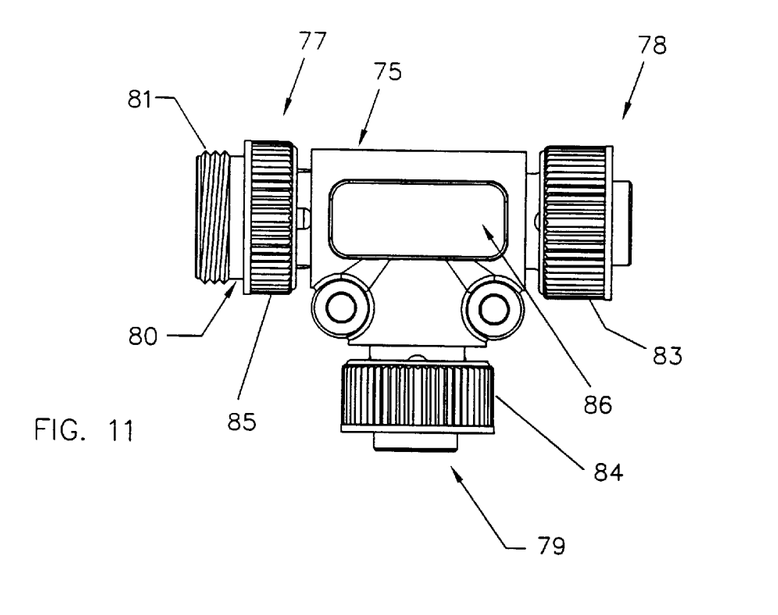
FIGS. 11 and 12 are side and end views of a network Tee incorporating the present invention.
Figure 12:
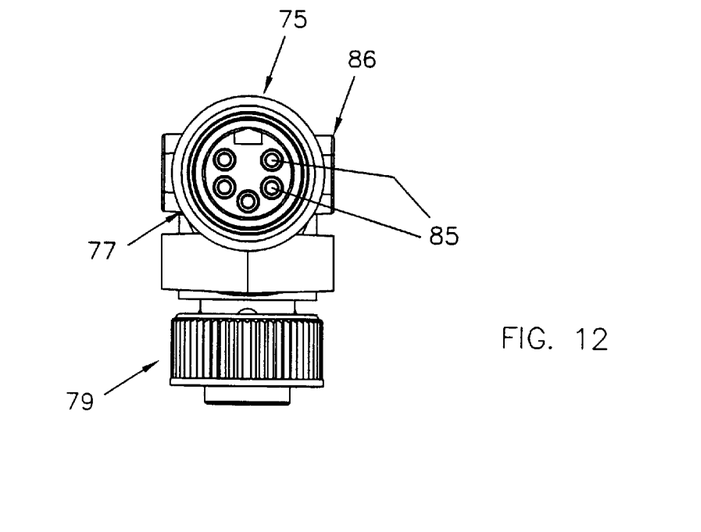

Turning now to FIGS. 11 and 12, there is shown a physical embodiment of the power monitor system described in the form of a Tee. A Tee is used to provide a junction or node in a network. Typically, a Tee is inserted in a network when there is a need to distribute power and/or data to different locations. Thus, referring to FIG. 10, the overall Tee is generally designated by reference numeral 75, and it includes three ports, including an input port 77 and two output ports 78, 79, respectively. In the illustrated embodiment, ports 77 and 78 are female connectors and port 79 is a male connector. The input port 77 includes an extension 80. Other variations of male or female connectors are possible according to the desire of the user.

The structure of each of the ports 77–79, including the nature of the connecting elements and the arrangement of the connectors may be as described in connection with the connectors 16 and 20 in FIGS. 2 and 3, respectively. The extension 80 includes an external or male thread 81 for coupling to a corresponding female connector (not shown) at the end of a network cable. The output ports 78, 79 include female connectors, each including an internally threaded coupling nut designated respectively 83 and 84 for receiving a mechanically coupling to corresponding male connectors of network cables connected to the Tee.

In the format of a Tee, the circuitry including the indicating LEDs is mounted on a printed circuit board mounted behind a transparent panel or window generally designated 86. The window 86 may be formed from a molding material which is light transmissive such as described above.

Persons skilled in the art will readily appreciate that different LED colors may be used, different flashing and flickering rates may be used, and different visual indicator devices could equally well be employed. It is thus intended that all such modifications and substitutions be encompassed within the spirit and scope of the appended claims.

We claim:

1. Apparatus for monitoring power on an electrical DC power bus including at least first and second power leads comprising:

a microprocessor coupled to said leads and receiving signals representative of the voltage across said leads, said microprocessor being programmed to periodically sample the voltage signals on said leads and to generate Vbus data representative of bus voltage;

a plurality of visual indicator devices;

said microprocessor being programmed to compute a first signal representative of an overvoltage condition when Vbus exceeds a predetermined overvoltage threshold value and to actuate one of said visual indicator devices to provide a visually distinctive signal for so long as said overvoltage condition is detected, and a second signal representative of a power surge condition when Vbus exceeds a predetermined level for a predetermined time period and then returns to a normal voltage range, said microprocessor thereupon latching said second signal while actuating one of said indicator devices in a second visually distinctive signal;

said microprocessor being programmed to compute a third signal representative of an undervoltage condition when said Vbus signal is less than a predetermined undervoltage threshold, and to actuate one of said indicators with a third visually distinctive signal; said microprocessor being programmed to compute a fourth signal representative of a brownout condition when said Vbus signal falls below said undervoltage level for a predetermined period and thereafter returns to a normal voltage range, said microprocessor latching said fourth signal while actuating one of said indicator devices to display a fourth visually distinctive signal.

2. The apparatus of claim 1 characterized in that said microprocessor actuates said indicator devices to generate said visual signals in a display cycle comprising a plurality of sequential time slots, each indicator being actuated in a predetermined one of said slots to generate a repeated intermittent visual signal in said indicators.

3. The apparatus of claim 2 wherein said latched signals generate corresponding visual signals for actuating said indicator devices in an associated time slot of said display cycle for each subsequent display cycle until reset; and wherein said microprocessor is programmed to reset said latched display indicators at a predetermined time.

4. The apparatus of claim 2 further comprising a Hall effect device for resetting said microprocessor to clear said latched indicator signals.

5. The apparatus of claim 1 wherein said microprocessor latches said detected power surge condition and said brownout condition until reset manually or automatically at a predetermined repeating time, whichever first occurs.

6. The apparatus of claim 1 wherein said microprocessor further computes Vave data representative of bus voltage averaged over time, said microprocessor being further programmed to compute a fifth signal representative of a voltage ripple condition when said bus power voltage exceeds a predetermined level and to actuate one of said visual indicator devices to provide a fifth visual signal for so long as said ripple condition is detected, and a sixth signal representative of a transient condition when said ripple condition is detected and then returns to a normal voltage range, said microprocessor thereupon latching said sixth signal while actuating one of said indicator devices in a sixth visually distinctive signal.

7. The apparatus of claim 1 wherein said bus includes data leads and said power leads and further comprising an electrical connector for connecting to an end of said bus, said connector including a connecting element for each of said data and power leads, a resistor connected to two of said connector elements associated with said data leads to provide electrical termination for said data leads, and said microprocessor being coupled to said power leads, and an overmold of light-transmissive material covering said indicators, said indicators being light-emitting diodes, said overmold permitting light from said indicators to be viewed externally.

8. Apparatus for monitoring power on an electrical DC power bus including at least first and second power leads comprising:

a microprocessor coupled to said leads and receiving signals representative of the voltage on said leads, said microprocessor being programmed to periodically sample the voltage signals on said leads and to generate Vbus data representative of bus voltage;

at least one visual indicator device;

said microprocessor being programmed to compute a first signal representative of an overvoltage condition when Vbus exceeds a predetermined overvoltage threshold value and to actuate said one visual indicator device in a first time slot of a visual display cycle comprising a plurality of slots occurring seriatim, said display cycle determined by said microprocessor to provide a first visual signal for so long as said overvoltage condition is detected, and a second visual signal distinctive from said first visual signal in a second time slot of said display cycle and representative of a power surge condition when Vbus exceeds a predetermined level for a predetermined time period and then returns to a normal voltage range, said microprocessor latching said second signal, whereby said first visual signal is displayed in said first time slot and only for so long as the associated condition exists, and said second visual signal is displayed in said second time slot once the associated condition is detected and until reset.

9. The apparatus of claim 8 characterized in that said microprocessor actuates said indicator devices to generate said visual signals in a display cycle comprising a plurality of sequential time slots, each indicator being actuated in a predetermined one of said slots to generate a repeated intermittent visual signal in said indicators.

10. The apparatus of claim 9 wherein latched signals generate corresponding visual signals for actuating said indicator devices in an associated time slot of said display cycle for each subsequent display cycle until reset; and wherein said microprocessor is programmed to reset said latched display indicators at a predetermined time.

11. The apparatus of claim 10 further comprising a Hall effect device for resetting said microprocessor to clear said latched indicator signals.

* * * * *